United States Patent
Nordbruch

(10) Patent No.: US 11,305,730 B2
(45) Date of Patent: *Apr. 19, 2022

(54) METHOD FOR CONTROLLING ACCESS TO A VEHICLE

(71) Applicant: Robert Bosch GmbH, Stuttgart (DE)

(72) Inventor: Stefan Nordbruch, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/796,117

(22) Filed: Feb. 20, 2020

(65) Prior Publication Data
US 2020/0189521 A1    Jun. 18, 2020

Related U.S. Application Data

(62) Division of application No. 15/524,746, filed as application No. PCT/EP2015/072419 on Sep. 29, 2015, now Pat. No. 10,604,113.

(30) Foreign Application Priority Data

Nov. 26, 2014  (DE) ...................... 10 2014 224 080.8

(51) Int. Cl.
*B60R 25/20* (2013.01)
*B60R 25/24* (2013.01)
(Continued)

(52) U.S. Cl.
CPC .......... *B60R 25/24* (2013.01); *B60R 25/2018* (2013.01); *G07C 9/00571* (2013.01);
(Continued)

(58) Field of Classification Search
CPC ............... B60R 25/24; B60R 25/2018; H04W 12/0802; H04W 12/00502; H04W 12/04;
(Continued)

(56) References Cited

U.S. PATENT DOCUMENTS 6,185,487 B1   2/2001   Kondo et al.
6,850,153 B1   2/2005   Murakami et al.
(Continued)

FOREIGN PATENT DOCUMENTS

CN    103810898 A    5/2014
DE    19753401 A1    6/1999
(Continued)

OTHER PUBLICATIONS

International Search Report dated Dec. 1, 2015, of the corresponding International Application PCT/EP2015/072419 filed Sep. 29, 2015.

*Primary Examiner* — Nay Tun
(74) *Attorney, Agent, or Firm* — Norton Rose Fulbright US LLP; Gerard Messina

(57) ABSTRACT

A method for controlling access to a vehicle. An electronic key for accessing one or multiple vehicle components is deactivated after the vehicle is switched off in order to park the vehicle in a parking position, so that an attempt with the aid of the deactivated electronic key to access the one or multiple vehicle components of the vehicle parked in the parking position may be prevented. Moreover, a system for controlling access to a vehicle, a parking system for vehicles, an access control system for controlling access to a vehicle, a vehicle, a user for a communication network, a method for operating a user for a communication network, and a computer program, are described.

5 Claims, 2 Drawing Sheets

(51) Int. Cl.
*G07C 9/00* (2020.01)
*H04W 12/082* (2021.01)
*H04W 12/04* (2021.01)
*H04W 12/61* (2021.01)

(52) U.S. Cl.
CPC ...... *G07C 9/00857* (2013.01); *H04W 12/082* (2021.01); *G07C 2009/0088* (2013.01); *H04W 12/04* (2013.01); *H04W 12/61* (2021.01)

(58) Field of Classification Search
CPC ............ G07C 9/00571; G07C 9/00857; G07C 2009/0088
See application file for complete search history.

(56) References Cited

U.S. PATENT DOCUMENTS

| | | | |
|---|---|---|---|
| 7,042,334 B2 | 5/2006 | Mosgrove et al. | |
| 8,880,239 B2 | 11/2014 | Kleve et al. | |
| 9,139,091 B1* | 9/2015 | Penilla | B60L 1/02 |
| 2003/0014164 A1 | 1/2003 | Shin | |
| 2004/0210757 A1 | 10/2004 | Kogan et al. | |
| 2006/0186988 A1 | 8/2006 | Proefke et al. | |
| 2006/0232131 A1 | 10/2006 | Endo | |
| 2008/0061925 A1* | 3/2008 | Bergerhoff | B60R 25/24 340/5.6 |
| 2008/0122595 A1 | 5/2008 | Yamamichi et al. | |
| 2008/0127693 A1 | 6/2008 | Cadiz et al. | |
| 2009/0096578 A1 | 4/2009 | Ogino et al. | |
| 2009/0219135 A1 | 9/2009 | Harvey et al. | |
| 2009/0284345 A1 | 11/2009 | Ghabra et al. | |
| 2010/0114616 A1 | 5/2010 | Touati | |
| 2010/0188189 A1 | 7/2010 | Bald et al. | |
| 2011/0140839 A1 | 6/2011 | DiSalvo et al. | |
| 2011/0313937 A1* | 12/2011 | Moore, Jr. | G07C 9/00896 705/307 |
| 2013/0033883 A1 | 2/2013 | Ward et al. | |
| 2013/0338883 A1 | 12/2013 | Savoure | |
| 2014/0129053 A1 | 5/2014 | Kleve et al. | |
| 2015/0161543 A1* | 6/2015 | Kadir | G06Q 10/06314 705/7.24 |
| 2016/0125679 A1 | 5/2016 | Savoure | |

FOREIGN PATENT DOCUMENTS

| | | | | |
|---|---|---|---|---|
| DE | 20003088 U1 | 8/2000 | | |
| DE | 102011107998 A1 | 1/2013 | | |
| DE | 102012111361 A1 | 5/2014 | | |
| DE | 102012222562 A1 | 6/2014 | | |
| DE | 102013002281 A1 | 8/2014 | | |
| JP | 2007315149 A | 12/2007 | | |
| JP | 2010126949 A | 6/2010 | | |
| JP | 2014169059 A | 9/2014 | | |
| WO | 2014121811 A1 | 8/2014 | | |
| WO | WO-2014121811 A1 * | 8/2014 | ......... | G06Q 30/0645 |

* cited by examiner

METHOD FOR CONTROLLING ACCESS TO A VEHICLE

CROSS REFERENCE

The present application is a divisional application of U.S. patent application Ser. No. 15/524,746, filed May 5, 2017, which is a U.S. National Phase of International Application PCT/EP2015/072419, filed Sep. 29, 2015, and claims the benefit under 35 U.S.C. § 119 of German Patent Application No. DE 102014224080.8, filed on Nov. 26, 2014, all of which are hereby incorporated by reference in their entireties.

FIELD

The present invention relates to a method for controlling access to a vehicle. Moreover, the present invention relates to a system for controlling access to a vehicle. Moreover, the present invention relates to a parking system for vehicles and an access control system for controlling access to a vehicle. Moreover, the present invention relates to a vehicle, a user for a communication network, a method for operating a user for a communication network, and a computer program.

BACKGROUND INFORMATION

German Patent Application No. DE 10 2012 222 562 A1 describes a system for managed parking lots for transferring a vehicle from a start position to a target position.

In fully automated (autonomous) so-called valet parking, a vehicle is parked by its driver at a drop-off point, for example in front of a parking deck, and from there the vehicle drives itself into a parking position/parking space and back to the drop-off point.

For autonomous valet parking, it is generally necessary for an operator of a parking facility to have access to the vehicle in order to guide it from a drop-off position to the parking position, or to provide the vehicle with an appropriate start signal so that the vehicle autonomously drives to the parking position. This similarly applies for a return of the vehicle from the parking position to the drop-off position.

Electronic or virtual keys which are analogous to physical keys are generally used to obtain remote access to the vehicle. Similarly as for physical keys, with virtual or electronic keys it must also be ensured that they are not misused for unauthorized access.

SUMMARY

An object of the present invention may therefore be regarded as providing an efficient way via which unauthorized access to a vehicle with the aid of an electronic key may be prevented.

Advantageous embodiments of the present invention are described herein.

According to one aspect of the present invention, a method for controlling access to a vehicle is provided, an electronic key for accessing one or multiple vehicle components being deactivated after the vehicle is switched off in order to park the vehicle in a parking position, so that an attempt to access the one or multiple vehicle components of the vehicle, parked in the parking position, with the aid of the deactivated electronic key may be prevented.

According to another aspect, a system for controlling access to a vehicle is provided, which includes a key management server that is designed for deactivating an electronic key for accessing one or multiple vehicle components after the vehicle is switched off in order to park the vehicle in a parking position, so that an attempt to access the one or multiple vehicle components of the parked vehicle with the aid of the deactivated electronic key may be prevented.

According to another aspect, a parking system for vehicles is provided, which includes a parking facility and the system for controlling access to a vehicle.

According to another aspect, an access control system for controlling access to a vehicle is provided, which includes a communication interface that is designed for receiving via a communication network a deactivation signal for deactivating, or an activation signal for activating, an electronic key for accessing one or multiple vehicle components after the vehicle is switched off in order to park the vehicle in a parking position, so that the access control system may have knowledge that the electronic key has access, or no longer has access, to the one or multiple vehicle components, the access control system also being designed for allowing guided access, with the aid of an activated electronic key, to the one or multiple vehicle components, and for preventing guided access with the aid of a deactivated electronic key.

According to another aspect, a vehicle is provided which includes the access control system for controlling access to a vehicle.

According to yet another aspect, a user for a communication network is provided, which includes a processor that is designed for ascertaining a deactivation signal or activation signal for an access control system of a vehicle for controlling the access to one or multiple vehicle components, and a communication interface that is designed for transmitting the deactivation signal or activation signal to the access control system via a communication network, so that the access control system may have knowledge that the electronic key has access, or no longer has access, to the one or multiple vehicle components.

According to another aspect, a method for operating a user for a communication network is provided, the user ascertaining a deactivation signal or activation signal for an access control system of a vehicle for controlling the access to one or multiple vehicle components, and transmitting the deactivation signal or activation signal to the access control system via a communication network, so that the access control system may have knowledge that the electronic key has access, or no longer has access, to the one or multiple vehicle components.

According to another aspect, a computer program is provided, which includes program code for carrying out the method for controlling access to a vehicle and/or for controlling a method for operating a user for a communication network when the computer program is executed on a computer.

The present invention thus encompasses in particular deactivating an electronic or virtual key, with the aid of which one or multiple vehicle components may be accessed after the vehicle is switched off. This means that after the vehicle is switched off, the electronic key may no longer be used to access the one or multiple vehicle components due to the fact that it has been deactivated, in particular invalidated. Thus, authorizations and/or access rights have preferably been advantageously withdrawn from the electronic key. Using the electronic key to access the one or multiple vehicle components after the vehicle is switched off, i.e., while the vehicle is parked in the parking position, may thus be advantageously prevented. Thus, during the time the vehicle is parked, no unauthorized access to the vehicle with the aid of the electronic key may take place. Thus, for example, the electronic key may no longer be used to open and/or start the vehicle. Driving operations that are not allowed, for example illegal, for example by an employee or by third parties, as well as theft from the vehicle or theft of the vehicle, may thus be advantageously prevented.

According to one specific embodiment, the communication network includes a WLAN network and/or a mobile communications network.

In one specific embodiment, a communication via the communication network is encrypted.

Within the meaning of the present invention, a parking facility may also be referred to as a parking lot, and is used as a parking area for vehicles. The parking facility thus forms in particular a contiguous area that includes multiple parking spaces (for a parking facility on private property), or parking positions (for a parking facility on public property). According to one specific embodiment, the parking facility may include a parking deck. In particular, the parking facility includes a parking garage.

Within the meaning of the present invention, "autonomous" means in particular that the vehicle navigates or drives or is guided in the parking facility independently, i.e., without intervention by a driver. The vehicle thus drives independently in the parking facility without a driver having to steer the vehicle. Guiding includes in particular transverse and/or longitudinal guidance of the vehicle. Such an autonomously driving vehicle, which may automatically park and unpark, is referred to as an AVP vehicle, for example. AVP stands for "automatic valet parking." Vehicles without this AVP functionality are referred to as normal vehicles, for example.

According to one specific embodiment, the vehicle is guided remotely controlled. This means that a vehicle-external remote control device is provided which guides the vehicle, i.e., is appropriately designed for the remote control.

Within the meaning of the present invention, a drop-off position (also referred to as a drop-off point) is a position at which a driver of the vehicle may leave his/her vehicle for an autonomous parking operation, and at which he/she may pick up the vehicle at a later point in time.

Within the meaning of the present invention, a parking position is a position at which the vehicle is to autonomously park.

In one specific embodiment, it is provided that the vehicle autonomously navigates or drives, or is guided remotely controlled, from the drop-off position to the parking position.

In another specific embodiment, it is provided that the vehicle parks autonomously in the parking position or parks remotely controlled.

In another specific embodiment, it is provided that the vehicle autonomously unparks from the parking position or unparks remotely controlled.

According to another specific embodiment, it is provided that the vehicle autonomously navigates or drives, or is guided remotely controlled, from the parking position to the drop-off position.

According to one specific embodiment, it is provided that the deactivated electronic key is reactivated, so that the one or multiple vehicle components may be accessed with the aid of the activated electronic key.

This may yield in particular the technical advantage that a new electronic key for accessing the one or multiple vehicle components does not have to be generated or created. This is because the deactivated electronic key may now be efficiently reused, provided that it has been reactivated.

Instead of or in addition to activating the deactivated key, according to one specific embodiment it is provided that an additional electronic key is provided for the access. According to one specific embodiment, the additional key is transmitted or sent via the communication network to the key management server and/or the system and/or to the vehicle. The additional key may be generated or created anew, for example with the aid of a terminal, preferably with the aid of a mobile terminal. Thus, for example, a driver may create or generate a new electronic key with the aid of his/her mobile terminal, and via the communication network, transmit it with the aid of his/her terminal to other users of the communication network, for example to the vehicle, to the system, and/or to the key management server.

In accordance with an example embodiment of the present invention, a new key is generated or created which may be used for accessing the vehicle.

The new or additional key may, for example, reactivate the deactivated key. This means that the new or additional key is used for activating the deactivated key. The new or additional key may, for example, be used directly for accessing the vehicle, i.e., the vehicle components.

Access control may be carried out even more easily and efficiently by using an additional key.

According to another specific embodiment, it is provided that for the deactivation or activation, a deactivation signal or activation signal is received, via a communication network, from an access control system of the vehicle for controlling the access to the one or multiple vehicle components, so that the access control system has knowledge that the electronic key has access, or no longer has access, to the one or multiple vehicle components.

This may yield in particular the technical advantage that, regardless of a key management server that may be present, the vehicle may be informed that the electronic key is to be deactivated or activated. The access control system thus advantageously has knowledge or information that the electronic key is to have access, or is no longer to have access, to the one or multiple vehicle components. This means that in the event of misuse of a key management server, which, for example, has improperly not deactivated an electronic key, a further security net is established in such a way that the access control system either accepts or blocks the electronic key. Thus, for example, a driver of the vehicle may transmit the deactivation signal or the activation signal via the communication network to the access control system of the vehicle via his/her mobile terminal, generally his/her terminal, for example a smart phone, for example a mobile telephone. The access control system thus withdraws appropriate access rights or authorizations from the electronic key, or declares it to be invalid. Similarly, for an activation, the access control system may reassign access rights or authorizations to the electronic key or once again declare it to be valid. This means in particular that the access control system blocks access with the aid of an electronic key in response to the deactivation signal. In response to an activation signal, the access control system accepts access to the one or multiple vehicle components with the aid of the electronic key.

This means that in the case of a remote or vehicle-external access to the one or multiple vehicle components with the aid of the electronic key, even when the electronic key is otherwise still valid or activated, the access control system still prevents or blocks, i.e., does not permit, the access when it has received a deactivation signal.

In another specific embodiment, it is provided that prior to parking, the electronic key is received by a key management server via a communication network, the key management server deactivating the key after the vehicle is switched off. This yields in particular the technical advantage that a driver of the vehicle him/herself no longer has to deal with deactivating the electronic key. This takes place, for example, automatically by the key management server. The driver of the vehicle may save time in this way. Since the key management server is generally operated by an operator of the parking facility who is generally well informed about when the vehicle has been parked or switched off, a point in time at which the key is to be deactivated may be satisfactorily and easily determined. This is because the electronic key generally should not be deactivated before the vehicle is switched off. Thus, the electronic key must not be deactivated too soon.

According to another specific embodiment, it is provided that the key management server receives via the communication network a deactivation instruction for deactivating the electronic key or an activation instruction for activating the deactivated key, the key management server deactivating the electronic key in response to the deactivation instruction, and activating the electronic key in response to the activation instruction.

A technical effect is thus advantageously achieved that the key may also be activated or deactivated via the communication network. This means, for example, that a driver of the vehicle may send the key management server a deactivation instruction or activation instruction in order to deactivate or activate the electronic key. The driver of the vehicle may thus advantageously maintain control of the activation or deactivation of his/her electronic key. In this way, unauthorized access to the vehicle with the aid of the electronic key may advantageously be prevented even more satisfactorily.

In another specific embodiment, it is provided that a time at which the deactivated key is reactivated is ascertained in such a way that sufficient time is available to start the vehicle with the aid of the activated key, so that the vehicle may drive from the parking position to a pick-up position at the right time, so that a person may pick up the vehicle at the pick-up position at a predefined pick-up time.

The technical effect is thus advantageously achieved that the deactivated key remains deactivated until it is needed again for the automatic valet parking (AVP). This is because the vehicle generally no longer has to be accessed until it has to drive to its pick-up position. Thus, the key may, and should, remain deactivated. Activating the key earlier could increase the risk of misuse.

In another specific embodiment, it is provided that the electronic key deactivates itself after a predefined deactivation time. This yields in particular the technical advantage that the electronic key deactivates itself without further action. An additional security net against misuse of the electronic key is thus advantageously established. If, for example, a key management server were compromised and/or a communication network for transmitting deactivation instructions were interfered with, the electronic key would still deactivate itself after the predefined deactivation time.

According to another specific embodiment, it is provided that the switching off of the vehicle is monitored with the aid of a vehicle-external monitoring system, an end of the switching off being detected based on the monitoring. This yields in particular the technical advantage that an end of the switching off may be detected, and in this regard a beginning of the parking may be recognized. This means in particular that a point in time at which the electronic key is to be deactivated and then reactivated may be recognized or detected.

According to one specific embodiment, the monitoring system includes one or multiple video cameras and/or one or multiple radar sensors and/or one or multiple ultrasonic sensors and/or one or multiple LIDAR sensors and/or one or multiple laser sensors and/or one or multiple photoelectric barriers and/or one or multiple door opening sensors.

According to one specific embodiment, it is provided that the key management server is also designed for reactivating a deactivated electronic key, so that the one or multiple vehicle components may be accessed with the aid of the activated electronic key.

According to another specific embodiment, it is provided that the system includes a processor that is designed for ascertaining a time at which the deactivated key is to be reactivated, in such a way that sufficient time is available to start the vehicle with the aid of the activated key, so that the vehicle may drive from the parking position to a pick-up position at the right time, so that a person may pick up the vehicle at the pick-up position at a predefined pick-up time, the key management server also being designed for activating the deactivated key at the predetermined time.

According to yet another specific embodiment, it is provided that the system includes a communication interface that is designed for receiving via a communication network a deactivation instruction for deactivating the electronic key or an activation instruction for activating the deactivated key, the key management server being designed for deactivating the electronic key in response to the deactivation instruction, and activating the electronic key in response to the activation instruction.

According to yet another specific embodiment, it is provided that the system includes a vehicle-external monitoring system for monitoring the switching off of the vehicle, so that an end of the switching off may be detected based on the monitoring.

According to yet another specific embodiment, it is provided that the user for a communication network is configured or designed for carrying out or implementing the method for operating a user for a communication network.

Functionalities of the method result analogously from functionalities of the system or the parking system or the access control system or the vehicle or the user, and vice versa. This means that device features result from their corresponding method features or system features, and vice versa. Corresponding statements made and advantages listed with regard to the method or the methods apply analogously to the system, the parking system, the access control system, the vehicle, and the user, and vice versa.

According to one specific embodiment, it is provided that the one or multiple vehicle components are elements selected from the following group of vehicle components: door opening system, starting system for starting a drive engine of the vehicle, lighting system of the vehicle, opening device of a glove compartment, electronic devices such as a radio or a navigation device, a steering wheel system, a drive system, and a gear system.

According to one specific embodiment, it is provided that a driving operation of the vehicle on or within the parking facility is at least partially, in particular completely, monitored and/or documented. This yields in particular the technical advantage that suitable measures may be taken quickly and efficiently in the event of an error. This is because errors may be recognized quickly due to the monitoring. The recording or documenting of the driving operation of the vehicle yields in particular the technical advantage that the driving operation of the vehicle may be reconstructed, even after the driving operation has concluded. In particular, errors that occur during the driving operation may be reconstructed. This may be advantageous for possible use as evidence in the event of damage to the vehicle. The monitoring and/or recording and/or documenting is carried out in particular with the aid of the monitoring system.

This means that, for example, a trip of the vehicle from the drop-off point or drop-off position to the parking position is monitored or recorded or documented. Similarly, this is carried out, for example, for the parking operation into the parking position, i.e., parking in the parking position. The same applies for unparking from parking position and also in particular for returning to the drop-off point. According to one specific embodiment, the data ascertained or created in conjunction with the monitoring or recording or documenting, which generally may also be referred to as monitoring data, are transmitted via the communication network to a, or the, user of the communication network. The user may track the monitored or recorded or documented driving operation in this way. This is carried out in particular in real time, so that the driver of the vehicle may do live tracking, for example via his/her mobile telephone, of the above-mentioned operations, i.e., the trip from the drop-off point to the parking position, parking in the parking position, unparking from the parking position, and returning to the drop-off point. Monitoring data include in particular video data, so that visual monitoring or recording or documenting is provided, so that the driver may visually track the above-mentioned operations, for example via his/her mobile terminal.

According to one specific embodiment, it is provided that after the vehicle is switched off, it communicates to the system or the parking system via the communication network that the vehicle is now parking, i.e., that the parking operation has thus begun, i.e., that the switching off has now ended, so that the system, in particular the parking system, i.e., in particular the key management server, is aware that an electronic key is now no longer required, so that the key management server now deactivates it or may deactivate it.

According to one specific embodiment, the user is a terminal, in particular a mobile terminal, for example a mobile telephone, for example a smart phone. According to one specific embodiment, the user is installed in the vehicle. According to one specific embodiment, the user is the vehicle.

According to one specific embodiment, multiple users are provided, which in particular have the same design or preferably have different designs.

The present invention is explained in greater detail below with reference to preferred exemplary embodiments.

DETAILED DESCRIPTION OF EXAMPLE EMBODIMENTS

Figure 1:
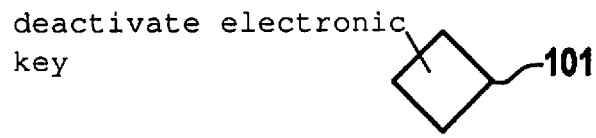
FIG. 1 shows a flow chart of a method for controlling access to a vehicle.

FIG. 1 shows a flow chart of a method for controlling access to a vehicle.

An electronic key for accessing one or multiple vehicle components after the vehicle is switched off in order to park the vehicle in a parking position is deactivated according to a step 101. As a result, an attempt to access the one or multiple vehicle components of the vehicle parked in the parking position with the aid of the deactivated electronic key may advantageously be prevented.

According to one specific embodiment, the electronic key has been transmitted beforehand to a parking facility management server for managing or operating a parking facility, such a parking facility management server preferably including a key management server, in particular the system according to the present invention for controlling access to a vehicle.

This means in particular that, within the scope of automatic valet parking or an automatic parking operation, the vehicle transmits an electronic key to the parking facility management server before reaching, or at, the drop-off point or drop-off position, so that the parking facility management server guides the vehicle within the scope of an automatic parking operation to the parking position, or provides the vehicle with data that are relevant for an autonomous trip to the parking position (for example, a digital map of the parking facility). The driver may leave his/her vehicle at the drop-off position. The vehicle subsequently drives autonomously to the parking position and parks there, i.e., switches off. This generally requires that the system according to the present invention or the parking facility management server accesses one or multiple vehicle components. This is carried out in particular with the aid of the electronic key. However, the electronic key is deactivated after the vehicle is switched off, so that during the parking of the vehicle, i.e., while the vehicle is parking in the parking position, the key may no longer be used to access the vehicle, i.e., the one or multiple vehicle components.

According to one specific embodiment, after a predetermined parking period ends, the key is reactivated, so that the vehicle may be accessed with the aid of the electronic key, and in particular the vehicle may be started with the aid of the electronic key, so that the vehicle may then drive or be guided back to the drop-off point or drop-off position.

Figure 2:
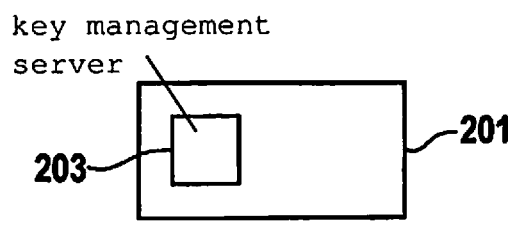
FIG. 2 shows a system for controlling access to a vehicle.

FIG. 2 shows a system 201 for controlling access to a vehicle.

System 201 includes a key management server that is designed for deactivating an electronic key for accessing one or multiple vehicle components after the vehicle is switched off in order to park the vehicle in a parking position, so that an attempt to access the one or multiple vehicle components of the parked vehicle with the aid of the deactivated electronic key may be prevented.

Figure 3:
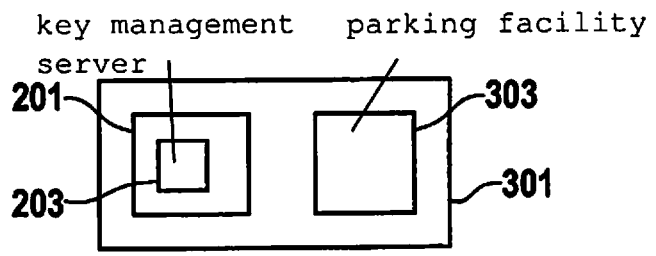
FIG. 3 shows a parking system for vehicles.

FIG. 3 shows a parking system 301 for vehicles. Parking system 301 includes a parking facility 303 and system 201 of FIG. 2.

Figure 4:
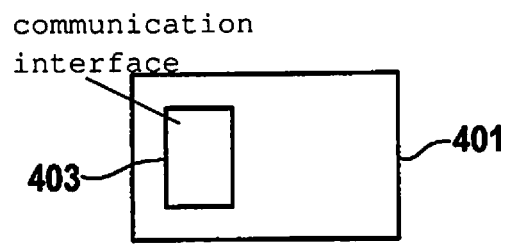
FIG. 4 shows an access control system for controlling access to a vehicle.

FIG. 4 shows an access control system 401 for controlling access to a vehicle, i.e., for controlling access to one or multiple vehicle components of the vehicle.

Access control system 401 includes a communication interface 403 that is designed for receiving via a communication network a deactivation signal for deactivating, or an activation signal for activating, an electronic key for accessing one or multiple vehicle components after the vehicle is switched off in order to park the vehicle in a parking position, so that access control system 401 may have knowledge that the electronic key has access, or no longer has access, to the one or multiple vehicle components. Access control system 401 is preferably designed for preventing or permitting remote access to the vehicle, i.e., to the one or multiple vehicle components, in response to a received deactivation signal or activation signal.

Access control system 401 is thus also designed for allowing guided access to the one or multiple vehicle components with the aid of an activated electronic key, and preventing guided access with the aid of a deactivated electronic key.

The access control system includes, for example, a processor for appropriately processing the deactivation signal or the activation signal, and for appropriately allowing (permitting) or preventing access.

Figure 5:
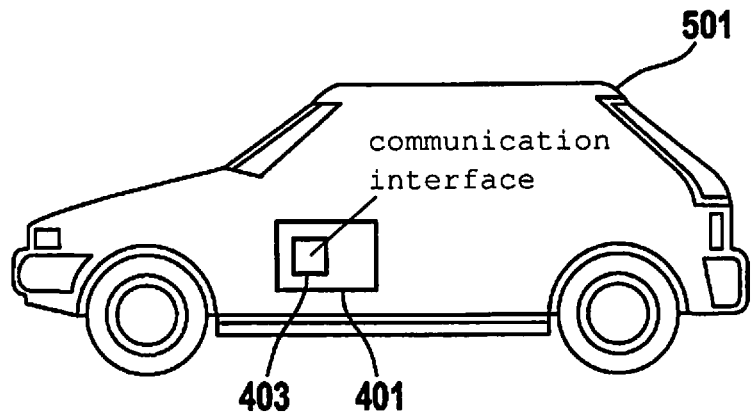
FIG. 5 shows a vehicle.

FIG. 5 shows a vehicle 501, the vehicle 501 including access control system 401 of FIG. 4.

Figure 6:
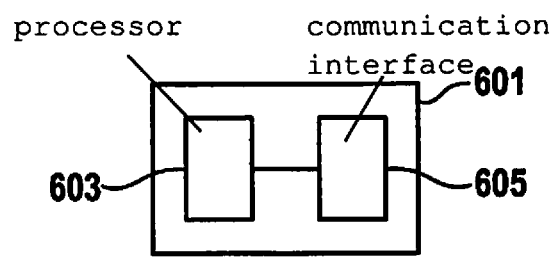
FIG. 6 shows a user for a communication network.

FIG. 6 shows a user 601 for a communication network.

User 601 includes a processor 603 that is designed for ascertaining a deactivation signal or activation signal for an access control system of a vehicle for controlling the access to one or multiple vehicle components. User 601 includes a communication interface 605 that is designed for transmitting the deactivation signal or activation signal to the access control system via a communication network, so that the access control system may have knowledge that the electronic key has access, or no longer has access, to the one or multiple vehicle components.

According to one specific embodiment, the user is a terminal, in particular a mobile terminal, for example a mobile telephone, for example a smart phone.

Figure 7:
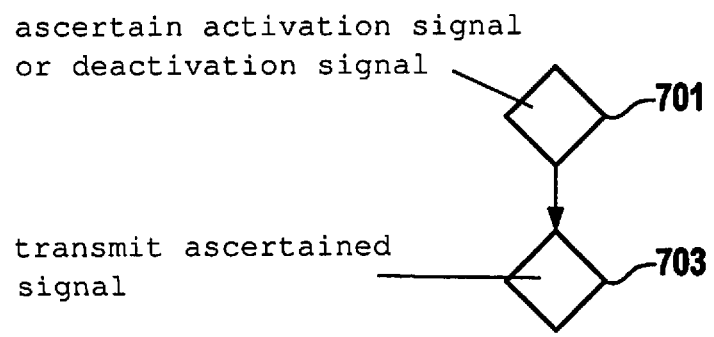
FIG. 7 shows a method for operating a user for a communication network.

FIG. 7 shows a flow chart of a method for operating a user for a communication network, or a user of a communication network.

According to a step 701, the user ascertains a deactivation signal or activation signal for an access control system of a vehicle for controlling the access to one or multiple vehicle components. The user transmits the deactivation signal or activation signal to the access control system via a communication network according to a step 703, so that the access control system may advantageously have knowledge that the electronic key has access, or no longer has access, to the one or multiple vehicle components.

According to one specific embodiment, the user is user 601 according to FIG. 6.

In summary, the present invention provides a technical and efficient concept, with the aid of which a third party may be prevented from opening and/or driving the vehicle during the parking operation by accessing one or multiple vehicle components with the aid of an electronic key. Such an electronic key is generally transmitted to an operator of the parking facility prior to a parking operation. Due to the deactivation of the electronic key according to the present invention after the vehicle is switched off, it may advantageously be ensured that an operator of the parking facility does not have unauthorized access to the vehicle during the parking period.

The concept here according to the present invention in particular, among others, is that, for example, a driver and/or an owner of the vehicle may deactivate the electronic key, which generally may also be referred to as a virtual key, online, for example via a terminal, in particular a mobile terminal, for example a smart phone, in particular a mobile telephone, after the vehicle is in the parking position, for example in a parking space.

According to one specific embodiment, it is provided that prior to the end of the parking operation, the driver or owner reactivates the deactivated electronic key, so that the vehicle may advantageously drive back to the drop-off point or to the drop-off position. This means that an activation signal is transmitted to the access control system by the user, for example. In particular, an activation instruction is transmitted to the key management server.

According to one specific embodiment, the processor is designed for ascertaining a deactivation instruction for deactivating the electronic key, or ascertaining an activation instruction for activating the deactivated key, the communication interface being designed for transmitting the deactivation instruction or the activation instruction via the communication network to a key management server, in particular to the system for controlling access to a vehicle.

According to one specific embodiment, the points in time for the activation and deactivation are triggered by the parking facility management system, i.e., the parking facility management server, in particular the system according to the present invention, for example the parking system. This takes place, for example, due to the fact that the system generally coordinates all of the operations within the parking facility, for example in the parking deck.

According to one specific embodiment, it is provided that the driver or owner may additionally track all operations during the entire trip from the drop-off point to the parking position, parking in the parking position, unparking from the parking position, and returning to the drop-off point, online, for example visually via a mobile terminal.

What is claimed is:

1. A parking system for vehicles, comprising:
a parking facility; and
a system for controlling access to a vehicle, including a key management server configured for deactivating an electronic key for accessing one or multiple vehicle components after the vehicle is switched off in order to park the vehicle in a parking position in the parking facility, so that an attempt to access the one or multiple vehicle components of the parked vehicle with the aid of the deactivated electronic key is prevented,
wherein the key management server is configured to provide a new or an additional electronic key to reactivate the deactivated key for accessing the one or multiple vehicle components,
wherein the new or the additional electronic key is generated or created anew by a driver of the vehicle.

2. The system as recited in claim 1, wherein the key management server receives via a communication network a deactivation instruction for deactivating the electronic key, the key management server deactivating the electronic key in response to the deactivation instruction.

3. The system as recited in claim 1, wherein the new or the additional electronic key is generated via a mobile terminal.

4. The system as recited in claim 1, wherein the electronic key deactivates itself after a predefined deactivation time.

5. The system as recited in claim 1, wherein the switching off of the vehicle is monitored via a vehicle-external monitoring system, an end of the switching off being detected based on the monitoring.

* * * * *